B. S. MOORE.
AUTOMOBILE GEAR SHIFT.
APPLICATION FILED FEB. 19, 1917.
1,369,259.
Patented Feb. 22, 1921.
4 SHEETS—SHEET 1.
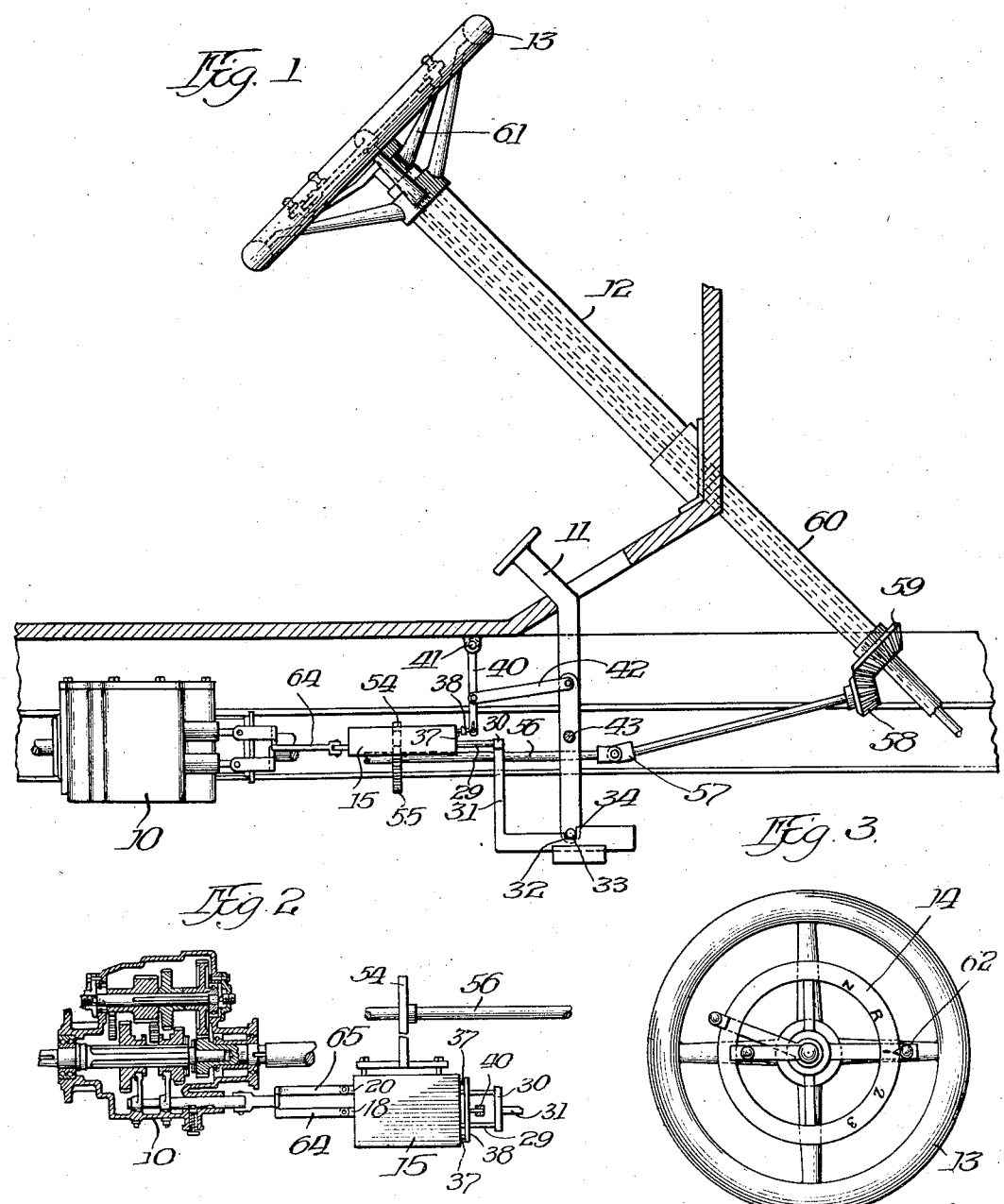

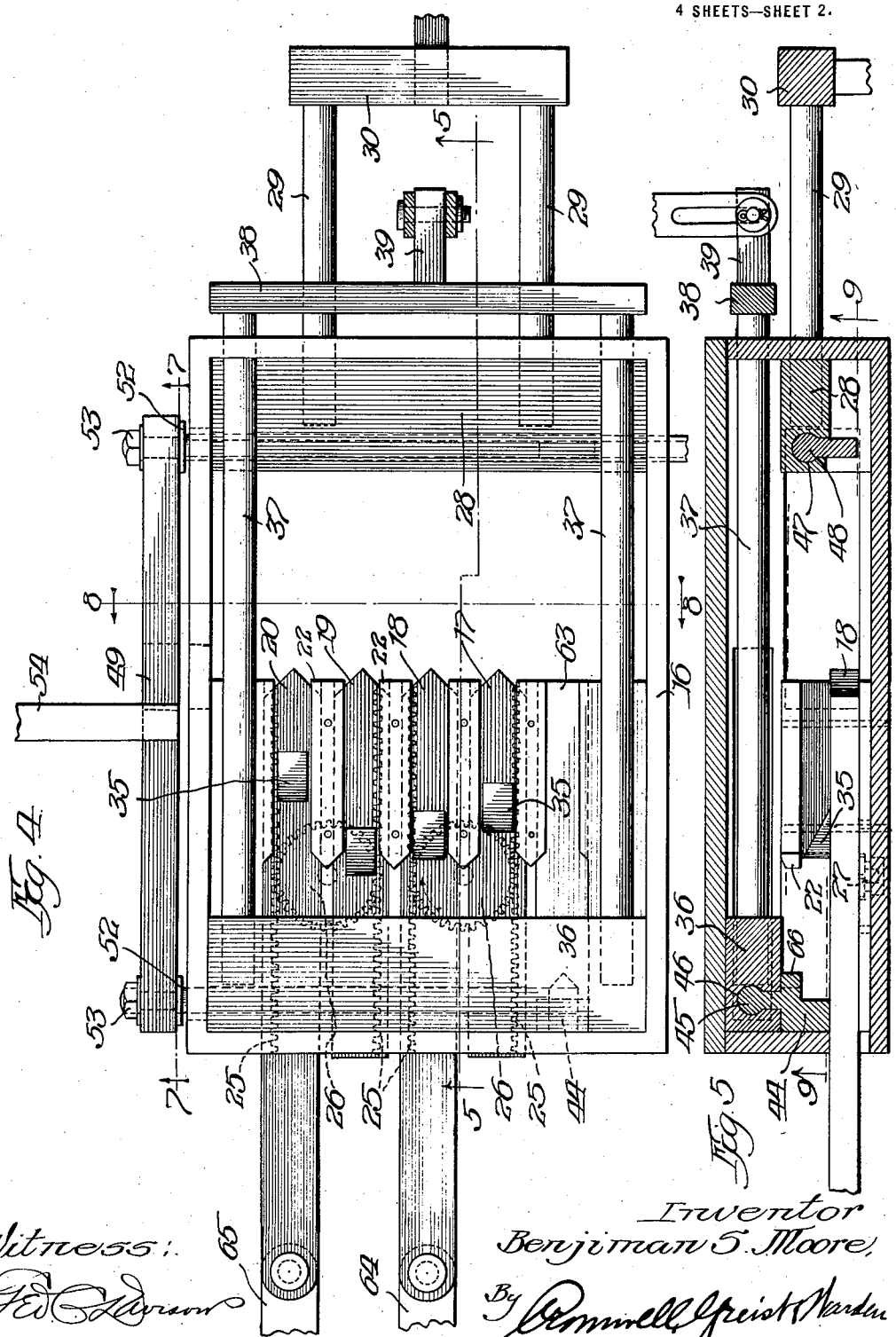

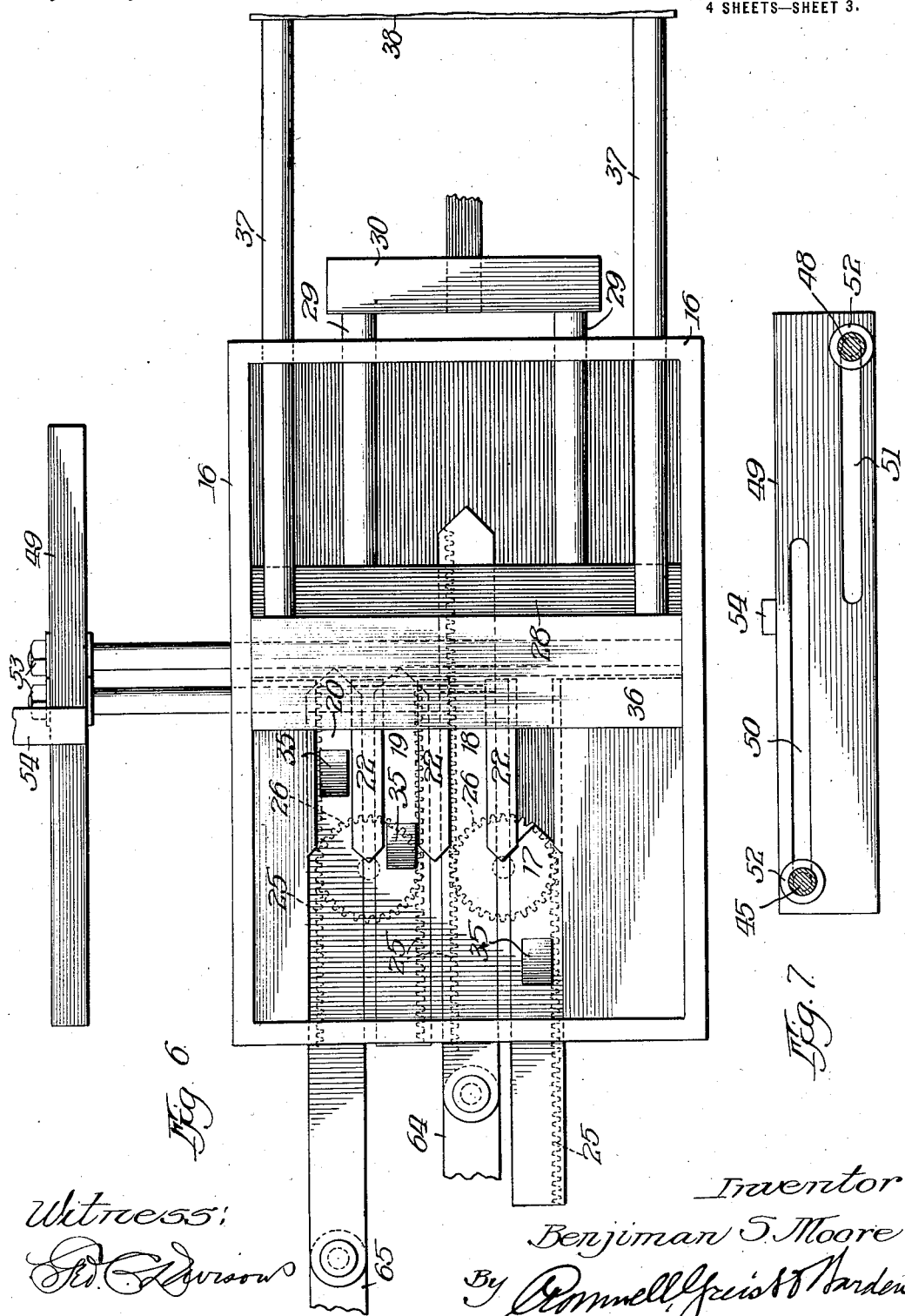

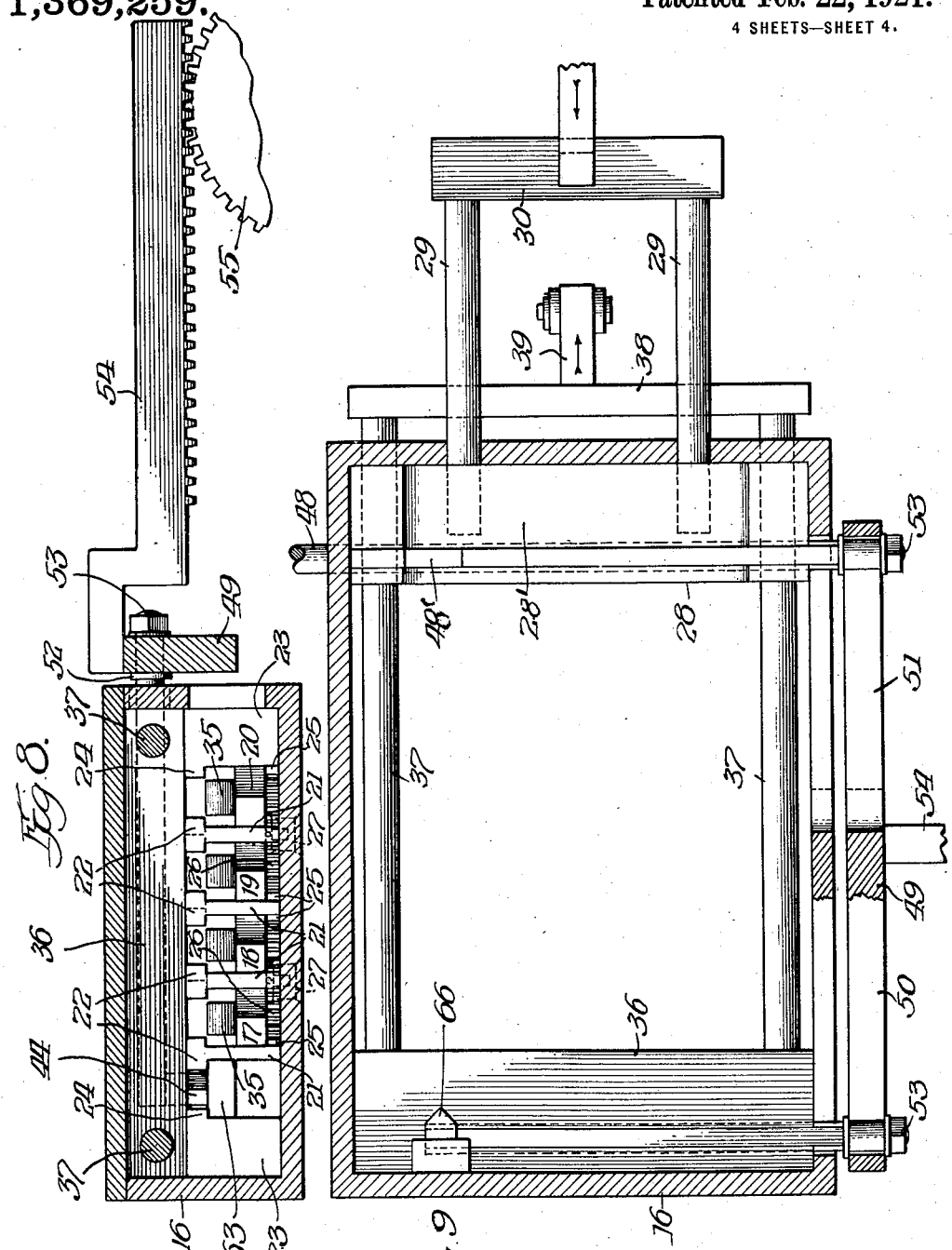

UNITED STATES PATENT OFFICE.

BENJIMAN S. MOORE, OF JOLIET, ILLINOIS.

AUTOMOBILE GEAR-SHIFT.

1,369,259.  Specification of Letters Patent.  Patented Feb. 22, 1921.

Application filed February 19, 1917. Serial No. 149,482.

*To all whom it may concern:*

Be it known that I, BENJIMAN S. MOORE, a citizen of the United States, residing at Joliet, in the county of Will and State of Illinois, have invented certain new and useful Improvements in Automobile Gear-Shifts, of which the following is a specification.

This invention relates to improvements in gear-shifting mechanism, and is particularly concerned with apparatus of this nature employed for changing the relation of transmission gears on self-propelled vehicles to obtain the different speeds at which the same are driven.

The general construction of gear-shifting mechanisms utilized on automobiles for setting the sliding type of transmission includes an operating lever which projects upwardly through the floor of the machine but which is separated from the steering wheel and its supporting column. The operation of this lever is impossible without removing one hand from the steering wheel, and when this is done the control of the machine is obviously impaired. Moreover, these levers frequently stick and thereby prevent the timely shifting of the gears. There is the further objection also that their position (usually at the center of the car) occupies a certain proportion of the leg space, thereby creating discomfort for the occupants, and they also interfere with the free use of lap robes because of the necessity for easy access to the lever in controlling the movements of the car.

The present invention aims to overcome the objections above noted. Its main and primary object is to provide a novel construction of gear-shifting mechanism which will eliminate entirely the hand manipulated operating lever, and through the medium of which the shifting of the gears may be effected by the foot, thereby avoiding the necessity of removing the operator's hand from the steering wheel and insuring proper control of the car at all times.

A further object of the invention is the utilization of the clutch-operating lever as the medium through which the gears may be shifted. By imparting this dual function to such lever it will be apparent that the adjusting of the transmission gears is greatly simplified, and such adjustment effected more expeditiously than with the arrangement now commonly employed.

Furthermore, the invention seeks to provide a gear-shifting mechanism wherein is embodied selective setting mechanism operable from the steering column and capable of operation while the clutch is closed or in service position without impairing the transmission gears or rendering them liable to mutilation.

Other objects and advantages of the invention will be apparent as the same is more fully understood, the improvements consisting in the novel construction, combination and arrangement of parts hereinafter fully described, illustrated in the accompanying drawings, and finally pointed out in the appended claims.

In the drawings:

Figure 1 is a view in elevation of a gear-shifting mechanism constructed in accordance with the present invention, only so much of the transmission, steering mechanism, and clutch operating mechanism as is necessary for an intelligent understanding of the invention being shown;

Fig. 2 is a top plan view of the selective setting mechanism, the transmission being shown in sectional plan view;

Fig. 3 is a top plan view of the steering wheel and quadrant carried thereby and illustrating the relation of the indicator of the herein described gear shift with respect to these parts;

Fig. 4 is a sectional plan view, on an enlarged scale, of the selective setting mechanism;

Fig. 5 is a longitudinal sectional view thereof, as on the line 5—5, Fig. 4;

Fig. 6 is a view similar to Fig. 4, the parts being illustrated in another position;

Fig. 7 is a sectional view on the line 7—7, Fig. 4;

Fig. 8 is a transverse sectional view as on the line 8—8, Fig. 4;

Fig. 9 is an inverted sectional plan view, as on the line 9—9, Fig. 5, certain parts being omitted.

Referring now in detail to the accompanying drawings, the numeral 10 designates the transmission case of an automobile with its contained gears, this being of any approved construction and therefore only conventionally illustrated. The clutch-shifting lever is designated by the numeral 11, while 12 and 13 designate the steering column and the steering wheel respectively. Associated with the steering wheel 13 is the usual quadrant 14 for the spark and throttle levers. Interposed between the transmission 10 and the clutch-operating lever 11 is the selective setting mechanism of the herein described invention, and this is designated in its entirety by the numeral 15. It includes a housing 16 wherein are arranged the setting elements for effecting the different changes of speed in the transmission 10. They include a plurality of longitudinally extending slides 17, 18, 19 and 20, and said slides are separated by means of a series of longitudinally extending guide bars 21 the upper edges of which are provided with guiding heads 22. Edge guides 23 are also employed at the sides of the housing 16, which edge guides are also provided with overhanging flanges 24 which project beyond the sides of the guides 23, the guiding heads 22 also projecting beyond the guides 21 for a purpose to be later explained. Each of the slides 17, 18, 19, and 20 is provided at its lower face, and at one of its edges, with a rack bar 25, the rack bars of adjacent slides being arranged at opposite edges thereof so as to provide a space of sufficient dimensions to accomodate a gear wheel 26 mounted for rotation on a stud 27, or its equivalent, arranged in the bottom of the housing 16. It will thus be seen that one of the gear wheels 26 meshes with the rack bars 25 of adjacent slides, that is to say, one wheel 26 is in mesh with the rack bar of the slides 17 and 18, while another similar gear is in mesh with the rack bar of the slides 19 and 20. This is clearly illustrated in Fig. 4. By reason of this engagement it will also be seen that when movement is communicated to one of the slides of each pair the other slide of that pair will be moved in the opposite direction, and this movement will be communicated to the transmission gears for setting the same at the different speeds as will presently appear. In the organization of the parts herein illustrated, it is intended that the slide 17 shall serve the purpose of setting the gears in the transmission for reverse; that the slide 18 shall position these gears for the first or low speed, and that the slides 19 and 20 shall position the gears for the intermediate or second and high or third speeds as to which the car may be driven. In the normal position of the slides, as illustrated in Figs. 4 and 5, it is to be observed that they extend approximately only one-half of the length of the housing 16, and this is also true of the length of the guides 21. The space in advance of the forward ends of the slides 17 to 21, inclusive, is therefore unobstructed and within this space is arranged a restoring cross-head 28. The cross-head 28 is of arched form, being cut away at its under side, as at 28′, which cut away portion is of sufficient length that the several slides 17 to 20, inclusive, may pass therethrough, in accordance with the projected positions of said slides in the different adjustments thereof. The restoring cross-head 28 is provided with a plurality of guide rods 29 which are connected to a cross-head 30, and said cross-head has depending therefrom an L-shaped actuator 31 the horizontal arm of which is provided with a notch 32 which receives a pin or stud 33 carried in the lower end of the clutch-operating lever 11. The forward side of said notch 32 is of greater depth than its rear side, thus providing a shoulder 34 at said forward edge. When therefore the clutch lever 11 moves to closed or service position said pin or stud 32 engages said shoulder 34 to move the actuator 31 forwardly, but when said lever 11 is thrown out, to move the clutch out of service position, the pin or stud 33 becomes disengaged from said notch 32 under conditions to be later stated.

Each of the slides 17 to 20, inclusive, is actuated by a tappet 35 which is arranged at the upper side thereof, and said slides are projected forwardly by a setting cross-head 36. This cross-head 36 is arranged in the upper portion of the housing 16 and its ends are adapted to slide over the upper faces of the edge guides 23. The cross-head 36, therefore, works in a different horizontal plane from the cross-head 28, and to effect the forward movement of said setting cross-head 36 the same is provided with a plurality of guide rods 37 which extend through the forward end of the housing 16 and are connected to a cross-head 38 having a stud 39 pivotally connected to a depending link 40 the upper end of which is pivotally connected preferably to the floor of the automobile, as at 41. This link 40 is also connected by a link 42 with the clutch-operating lever 11, the point of connection of the link 42 with said lever 11 being above the fulcrum 43 of the lever 11. As the pin or stud 33 is below said fulcrum 43 it is apparent that the cross-heads 36 and 38 will be moved in opposite directions when the clutch-lever 11 is actuated.

It will be understood, of course, that each of the slides 17, 18, 19 and 20 is set independently of the others to provide for the various positions of the transmission gears in the transmission box 10, and this is accomplished through the medium of an engaging head 44 carried by an adjusting slide 45 received by a channel 46 extending longitudinally of the said cross-head 36. The channel 46 in its cross-section is of the formation of a key hole slot, and the slide 45 corresponds thereto. Hence, while the slide 45 may freely travel through the length of the slot 46, it is incapable of separation, and the actuating head 44 is thus held in engagement with the setting cross-head 36.

Within the restoring cross head 28 is also arranged a channel 47 of key slot formation which receives an adjusting slide 48 having a notch 48' positioned therein so as to be in alinement with the engaging head 44. The slides 45 and 48 are connected to a supporting bar 49 which is arranged at the exterior of the housing 16. This bar is provided with longitudinal slots 50 and 51 which are disposed in different horizontal planes, the slide 45 having one end disposed in the slot 50 while the slide 48 has one of its ends arranged within the slot 51. Each of these slides is permitted to freely move in the slot with which it is associated and is prevented from being displaced therefrom by a collar 52 located at one side of the slide 49 and a securing nut 53 positioned at the opposite side thereof. Extending outwardly from the supporting bar 49 is a rack bar 54 the teeth of which are in mesh with a gear wheel 55 carried by a shaft 56, a universal joint 57 being arranged in said shaft 56 to permit angular movement of said shaft. The forward end of said shaft 56 has a bevel gear 58 which meshes with a corresponding gear 59 carried by a tubular shaft 60 positioned within the steering column 12, and said tubular shaft 60 has connected thereto an operating lever 61 having an indicator 62 which coöperates with suitable designations on the quadrant 14 for denoting the different positions to which the selective setting mechanism is moved. In the present instance these designations include the letters "N" "R" and the numerals "1", "2" and "3", signifying the neutral reverse, first, second and third positions of the transmission gears, the latter three designations corresponding to the positions for the first, second and third speeds under which the automobile may be driven. It will thus be seen that on the rotation of the shaft 56 by the manipulation of the lever 61 to the different positions referred to the rack bar 54 will be moved in relation to the housing 16, and if moved away from the housing the adjusting slides 45 and 48 will be moved in the cross heads 36 and 28, thereby bringing the engaging head 44 and the notch 48' of the slide 48 to the required position opposite to any one of the slides 17, 18, 19 and 20.

The neutral position of the engaging head 44 is, of course, wholly removed from associated relation with the several slides 17, 18, 19 and 20, and there is a channel 63 between the slide 17 and the contiguous edge guide 23 which receives the engaging head 44 and through which said head may pass when positioning the transmission gears in their neutral relation.

The slides 18 and 20 are extended rearwardly from the housing 16 and are of greater length than the slides 17 and 19, and said slides 18 and 20 are pivotally connected to links 64 and 65 respectively, said links 64 and 65 being engaged with the shifting elements of the several gears within the transmission 10, and thus being adapted to position the gears at the several speeds, as well as the reverse and neutral positions, at which the automobile is to be driven.

The forward ends of the slides 17, 18, 19 and 20 are beveled or arrow shaped to facilitate their introduction to the notch 48' of the slide 48. By reason of this construction should the notch 48' not be in exact alinement with the particular slide which is received by said notch, the beveled ends will admit of the easy penetration of the slides to said notch. The engaging head 44 is also provided with a beveled lug 66 and said beveled lug engages with the beveled rear ends of the guiding heads 22 to facilitate the introduction of the engaging head 44 to the several spaces between said guiding heads and into engagement with the tappet 35 of each of said slides.

The operation of the herein described gear shift is as follows: Assuming the parts to be in the position shown in Fig. 4, the gears of the transmission are in neutral positions, and the motor of the automobile may operate without any driving connection between the same and the driving axle of the machine. To position the transmission gears for first or low speed the indicator 62 is moved opposite to the numeral "1" on the quadrant 14, and this results in a partial rotation of the tubular shaft 60 which, in turn, rotates the shaft 56 through the gears 58 and 59. The gear 55 being in mesh with the rack bar 54 moves the latter away from the housing 16 and this movement withdraws the adjusting slides 45 and 48 to such a point that the engaging head 44 is above the space between the partitions 21 which guide the slide 18. Pressure is now applied to the clutch pedal 11 to throw the clutch of the automobile into non-service position, and as the pedal 11 is thus moved the cross head 38 is also moved forwardly by the link 42 which movement causes an advance of the setting cross head 36. In this movement of the cross head 36 the engaging head 44 is brought into contact with the tappet 35 of the slide 18, and as the cross head 36 continues to advance the slide 18 is also moved forwardly. Through the rack bar 25 of said slide and the gear wheel 26 with which it is engaged, the slide 17 will move rearwardly, but this rearward movement of said slide 17 has no effect in such positioning of the slide on the transmission gears. To the contrary, the forward movement of the slide 18 draws the link 64 forwardly and this shifts the transmission gears into their low speed engagement. Bearing in mind the fact that the notch 48' is in alinement with the engaging head 44 so that the projected end of the slide 18 may pass through said slot, it is now possible for the clutch pedal 11 to be returned to its service position. In doing this the actuator 31 is freed from any movement that will impair the position of the advanced slide 18, and consequently the latter remains in position which maintains the transmission gears in low speed.

If it be now desired to shift the transmission to second or intermediate speed, the operating lever 61 is moved to a point opposite to the numeral "2" on the quadrant 14, and this positions the engaging head 44 opposite to the tappet 35 of the slide 19. It will be understood, however, that this further movement of the engaging head 44 is accomplished while the clutch of the automobile is still in service position. When the head 44 is thus moved the notch 48' of the slide 48 has moved with it and is thus passed to a point where it is not alined with the previously projected slide 18. If the clutch pedal 11 be now moved to non-service position, and the clutch is thrown out, such movement of the pedal 11 causes the actuator 31 to move rearwardly, carrying with it the restoring cross head 28 and such movement of the cross head 28 causes the slide 48 to engage the projected end of the slide 18 and thereby moves this slide rearwardly or to its normal position shown in Fig. 4. At the same time, however, the setting cross head 36 is moving forwardly with the engaging head 44 in contact with the tappet 35 of the slide 19, but the forward end of said slide 19, being now opposite to the notch 48', is received by the notch 48' and continues its forward movement to the point where the slide 19, acting through the gear wheel 26 with which it is engaged and the slide 20, effects through the link 65 a shifting of the transmission gears to the position of second or intermediate speed. When the clutch pedal 11 is thrown to non-service position, the stud 32 being in engagement with the notch 33 of the actuator 31 moves the latter rearwardly to such a point that the restoring cross head 28 is enabled to set the previously projected slide 18 to its normal position when the clutch pedal 11 has moved through approximately only one-half of its range of movement when passing to non-service position, and in continuing beyond this point the stud 32 is disengaged from said notch. The slide 36, however, continues to advance. As the clutch pedal 11 is restored to service position the stud 32 engages the shoulder 34 at an appropriate time, and thereby shifts the actuator 31 in a forward direction so that the restoring slide 28 is moved completely forwardly to the position shown in Fig. 4, at the time the clutch pedal 11 reaches its full service position.

The operation which has been above described applies wholly to the setting of the selective mechanism for effecting engagement of the transmission gears in the first or low speed and second or intermediate speed. For setting the gears in third or high speed or in reverse or neutral positions, it is only necessary to actuate the operating lever 61 to these several positions as indicated by the appropriate symbols on the quadrant 14, whereupon the engaging head 44 will be correspondingly shifted to engage the particular slides, so far as the third or high speed or reverse positions are concerned, and then by shifting the clutch pedal 11 there follows a corresponding positioning of the transmission gears. Obviously, when the engaging head 44 is opposite to the channel 63, which is the neutral position of said engaging head, there may be a free forward movement of said engaging head without the shifting of any of the slides 17, 18, 19 or 20.

While the general advantages of the herein described gear shift will be apparent from the foregoing description, it is to be observed that the shift will permit the driver of an automobile equipped with the invention to throw out the clutch between the motor and the driving shaft so that the machine may coast without disturbing the relation of the transmission gears; furthermore, if a change in relation of the gears be desired the particular speed may be selected and thereupon the shifting of the clutch will effect change of the gears to the new speed so selected. Moreover the meshing of the gears, when shifting to the various speed ratios, may be felt by the driver so that he is enabled to sense the actual engagement of the gears when changing from one speed to another.

I claim:

1. In a gear shift of the class described, the combination with the transmission of an automobile, and the clutch shifting mechanism, of selective setting mechanism interposed between said clutch shifting mechanism and said transmission for controlling the speed ratios of the transmission gears, said setting mechanism including a plurality of longitudinally-movable gear-positioning slides, a movable cross head, laterally shiftable connections between said cross head and said gear-positioning slides for effecting coöperative relation between said cross head and the independent slides, whereby to position the latter for varying the speed ratios of the transmission gears, means for restoring said gear positioning slides to normal position, and means for actuating said cross head and said restoring means simultaneously with the positioning of the clutch shifting mechanism to service and non-service positions.

2. In a gear shift of the class described, the combination with the transmission of an automobile, and a clutch shifting mechanism, of selective setting mechanism interposed between said clutch shifting mechanism and said transmission for controlling the speed ratios of the transmission gears, said setting mechanism including a plurality of longitudinally-movable gear-positioning slides, a cross head for moving said slides for changing the speed ratios of the transmission gears, laterally-movable connections between said cross head and said slides for effecting operative engagement of the cross head with said slides independently of each other, and thereby vary the speed ratios of the transmission gears, means for restoring said slides to normal position, an operating lever associated with the steering mechanism of the automobile and adapted to supervise said selective setting mechanism, connections between said operating lever and said setting mechanism for controlling the condition of the latter in accordance with the varying positions to which said operating lever is shifted, and means for shifting the transmission gears through said setting mechanism when said clutch shifting mechanism is operated to service and non-service positions.

3. In a gear shift of the class described, the combination with a driving gear transmission, and clutch-shifting mechanism, of means interposed between said clutch-shifting mechanism and said driving gear transmission for changing the speed ratios of the gears of said transmission including a plurality of gear operating slides, a longitudinally movable cross-head in juxtaposition to said slides, a contact element associated with said cross-head and movable laterally thereof for engagement with each of said gear-actuating slides independently of the others, means for positioning said contact element from the steering column, and means for actuating said cross-head to effect contact of said element with the selected gear-actuating slide on movement of the clutch-shifting mechanism to non-service position.

4. In a gear shift of the class described, the combination with a driving gear transmission, and clutch-shifting mechanism, of means interposed between said clutch-shifting mechanism and said driving gear transmission for changing the speed ratios of the gears of said transmission including a plurality of gear-operating slides, a longitudinally-movable cross-head in juxtaposition to said slides, a contact element associated with said cross-head and movable laterally thereof for engagement with each of said gear-operating slides independently of the others, means for positioning said contact element from the steering column, means for actuating said cross-head to effect contact of said element with the selected gear-operating slide on movement of the clutch-shifting mechanism to non-service position, and means for restoring the gear-operating slides to normal position in advance of movement of the selected gear-operating slide.

5. In a gear shift of the class described, the combination with a driving gear-transmission, and clutch-shifting mechanism, of means interposed between said clutch-shifting mechanism and said driving-gear transmission for changing the speed ratios of the gears of said transmission including a plurality of gear-operating slides, a longitudinally movable cross-head in juxtaposition to said slides, a laterally movable contact element associated with said cross-head and adapted for engagement with each of said gear-operating slides independently of the others, means for positioning said contact element from the steering column, means for actuating said cross-head to effect contact of said element with the selected gear-operating slide on movement of the clutch shifting mechanism to non-service position, a second cross-head arranged in advance of the gear-operating slides, and means associated with said cross-head and having provision for engagement with all of said gear-operating slides excepting the selected slide to restore the slides to normal position.

6. In a gear shift of the class described, the combination with a driving-gear transmission, and clutch-shifting mechanism, of means interposed between said clutch-shifting mechanism and said driving gear transmission for changing the speed ratios of the gears of said transmission and including a housing, a plurality of longitudinally-movable gear-operating slides arranged therein, a setting cross-head extending transversely of said slides and movable thereover longitudinally of said housing, a contact element mounted on said setting cross-head and movable across said slides for engagement with each of the latter independently of the others, a restoring cross-head also mounted in said housing in advance of said gear-operating slides and also movable longitudinally of said housing, an adjusting slide carried by said restoring cross-head and adapted to engage the projected gear-operating slides other than the selected slide, whereby to restore the slides to normal position, means for actuating said contact element and said adjusting slide from the steering column for setting the predetermined slide, and means for actuating the setting and restoring cross-heads on movement of the clutch-shifting mechanism to non-service position, whereby to change the speed ratios of the gears of the transmission in accordance with the predetermined positioning of the selected gear operating slide.

7. In a gear shift of the class described, the combination with a driving-gear transmission, and clutch-shifting mechanism, of means interposed between said clutch-shifting mechanism and said driving gear transmission for changing the speed ratios of the gears of said transmission including a housing, a plurality of longitudinally-movable gear-operating slides arranged therein, a setting cross-head extending transversely of said slides and movable thereover longitudinally of said housing, a contact element mounted on said setting cross-head and movable across said slides for engagement with each of the latter independently of the others, a restoring cross-head also mounted in said housing in advance of said gear-operating slides and also movable longitudinally of said housing, means associated with said cross-head and having provision for engagement with all of said gear-operating slides excepting the selected slide to restore the slides to normal position, means for actuating said contact element of the setting cross-head and said engaging means of the restoring cross-head, whereby to set the predetermined slide, and operating connections between the pedal of said clutch-shifting mechanism and the restoring and setting cross-heads to move said cross-heads in opposite directions and effect the shifting of the transmission-gears when said clutch-pedal is moved to non-service position.

8. In a gear shift of the class described, the combination with a driving-gear transmission, and clutch shifting mechanism, of means interposed between said clutch-shifting mechanism and said driving gear transmission for changing the speed ratios of the gears of said transmission including a housing, a plurality of longitudinally-movable gear-operating slides arranged therein, a setting cross-head extending transversely of said slides and movable thereover longitudinally of said housing, a contact element mounted on said setting cross-head and movable across said slides for engagement with each of the latter independently of the others, a restoring cross-head also mounted in said housing in advance of said gear-operating slides and also movable longitudinally of said housing, means associated with said restoring cross-head and having provision for engagement with all of said gear-operating slides excepting the selected slide to restore the slides to normal position, means for simultaneously moving the contact element of the setting cross-head and the engaging means of the restoring cross-head, whereby to set the predetermined slide, and operating connections between the pedal of the clutch-shifting mechanism and the restoring and setting cross-heads whereby to move said cross-heads in opposite directions when said pedal is moved to non-service position, said operating connections including means for releasing the restoring cross-head from its engagement with said clutch-pedal when the latter has reached a predetermined point in its movement to non-service position, whereby to bring the restoring cross-head to rest when the gear-operating slides have been moved to normal position, and additional means for moving the setting cross-head to actuate and position the selected gear-operating slide throughout the continuing movement of said clutch-lever when moving to non-service position.

9. In a gear shift of the class described, the combination with a driving-gear transmission, and clutch-shifting mechanism, of means interposed between said clutch-shifting mechanism and said driving gear transmission for changing the speed ratios of the gears of said transmission including a housing, a plurality of longitudinally-movable gear-operating slides arranged therein, a setting cross-head extending transversely of said slides and movable thereover longitudinally of said housing, a contact element mounted on said setting cross-head and movable across said slides for engagement with each of the latter independently of the others, a restoring cross-head also mounted in said housing in advance of said gear-operating slides and also movable longitudinally of said housing, means associated with said restoring cross-head and having provision for engagement with all of said gear-operating slides excepting the selected slide to restore the slides to normal position, means for actuating said contact element of the setting cross-head and said engaging means of the restoring cross-head, whereby to set the predetermined slide, an actuator connected to the restoring cross-head, a releasable connection between said actuator and the pedal of the clutch-shifting mechanism, whereby to free the restoring cross-head from engagement with said clutch-pedal at a predetermined point in the movement of the clutch-pedal to non-service position and before completion of such movement to bring the restoring cross-head to rest when the slides have been moved to normal position, and connections between said clutch-pedal and setting cross-head, whereby to move the latter throughout the entire stroke of the clutch-pedal in its movement to non-service position, and thereby to position the selected slide.

10. In a gear shift of the class described, the combination with a driving-gear transmission, and clutch shifting mechanism, of means interposed between said clutch-shifting mechanism and said driving gear transmission for changing the speed ratios of the gears of said transmission including a housing, a plurality of longitudinally-movable gear-operating slides arranged therein, a setting cross-head extending transversely of said slides and movable thereover longitudinally of said housing, a contact element slidably connected to said setting cross-head and movable across said slides for engagement with each of the latter independently of the others, a restoring cross-head also mounted in said housing in advance of said gear operating slides and also movable longitudinally of said housing, an adjusting slide carried by said restoring cross-head and provided with a notch arranged in alinement with the contact element of the setting cross-head, the adjusting slide with the exception of the notched portion thereof being adapted to engage the projected gear-operating slides other than the selected slide, whereby to restore the slides to normal position, means for actuating said contact element and said adjusting slides simultaneously for setting the predetermined slide, and means for actuating the setting and restoring cross-heads on movement of the clutch-shifting mechanism to non-service position, whereby to change the speed ratios of the gears of the transmission in accordance with the predetermined position of the selected gear-operating slide.

11. In a gear shift of the class described, the combination with a driving gear transmission, and clutch shifting mechanism, of means interposed between said clutch shifting mechanism and said driving gear transmission for changing the speed ratios of the gears of said transmission including a housing, a plurality of longitudinally-movable gear-operating slides arranged therein, a setting cross-head extending transversely of said slides and movable thereover longitudinally of said housing, a contact element mounted on said setting cross-head and movable across said slides for engagement with each of the latter independently of the others, each of said slides being provided with a tappet for engagement by said contact element, a restoring cross-head also mounted in said housing in advance of said gear-operating slides and also movable longitudinally of said housing, an adjusting slide carried by said restoring cross-head and adapted to engage the projected gear-operating slides other than the selected slide, whereby to restore the slides to normal position, said adjusting slide being provided with a notch arranged in alined relation to the contact element of the setting cross-head, said notch being adapted to receive the projected selected slide, means for actuating said contact element of the setting cross-head and said adjusting slide of the restoring cross-head for setting the predetermined slide, and means for actuating and setting the restoring cross-head on movement of the clutch-shifting mechanism to non-service position, whereby to change the speed ratios of the gears of the transmission in accordance with the predetermined positioning of the selected gear-operating slides.

12. In a gear shift of the class described, the combination with a driving gear transmission, and clutch shifting mechanism, of means interposed between said clutch shifting mechanism and said driving gear transmission for changing the speed ratios of the gears of said transmission including a housing, a plurality of longitudinally-movable gear-operating slides arranged therein, said slides being disposed in pairs, one of the slides of each pair being elongated and having connection with certain of the transmission gears, rack bars arranged at opposite portions of the slides of the respective pairs, a gear wheel in the housing and arranged between the rack bars of the slides of each pair, whereby the slides of each pair are caused to move in opposite directions when movement is imparted to either of the same, a setting cross-head extending transversely of said slides and movable thereover longitudinally of said housing, a contact element mounted on said setting cross-head and movable across said slides for engagement with each of the latter independently of the others, a restoring cross-head also mounted in said housing in advance of said gear-operating slides and also movable longitudinally of said housing, means associated with said resetting cross-head and having provision for engagement with all of said gear-operating slides excepting the selected slide to restore the slides to normal position, means for actuating the contact element of the setting cross-head and the engaging means of the restoring cross-head, whereby to set the predetermined slide, and means for actuating said setting and restoring cross-heads on movement of the clutch-shifting mechanism to non-service position, whereby to change the speed ratios of the gears of the transmission in accordance with the predetermined positioning of the selected gear-operating slides.

13. In a gear shift of the class described, the combination with a driving gear transmission and clutch-shifting mechanism, of means interposed between said clutch-shifting mechanism and said driving gear transmission for changing the speed ratios of the gears of said transmission including a housing, a plurality of longitudinally-movable gear-operating slides arranged therein, a pair of cross-heads arranged in said housing and movable longitudinally thereof, said cross-heads being arranged in different planes, one of said cross-heads being provided with adjustable means for engaging one of said gear-operating slides independently of the others and thereby to position the same for actuating the transmission gears for the desired speed ratios, the other of said cross-heads being provided with means adjustable thereon and with respect to said gear-operating slides, whereby to restore the gear-operating slides except the selected slide to normal position, and means for moving said cross-heads in opposite directions when said clutch-shifting mechanism is moved to non-service position.

14. In a gear-shift of the class described, the combination with a driving gear transmission, and clutch-shifting mechanism, of means interposed between said clutch-shifting mechanism and said driving gear transmission for changing the speed ratios of the gears of said transmission including a housing, a plurality of longitudinally-movable gear-operating slides arranged therein, a pair of cross-heads extending transversely of said housing and movable longitudinally thereof, said cross-heads being arranged in different planes, one of said cross-heads being arranged over said gear-operating slides and provided with means adjustable transversely of said slides for effecting engagement with one of said slides independently of the others, whereby to position the same to selected relations to the desired speed ratio of the transmission gears, the other of said cross-heads being arranged in advance of said gear-operating slides and provided with adjustable means for contacting the ends thereof excepting the selected slide, whereby to restore said gear-operating slides to normal position, means for simultaneously adjusting the respective adjustable means of the cross-heads, and means for actuating said cross-heads to move the same in opposite directions within said housing when the clutch-shifting mechanism is moved to non-service position.

In witness whereof I have hereunto signed my name in the presence of two subscribing witnesses.

BENJIMAN S. MOORE.

Witnesses:
 MARY C. BROWER,
 EBBA F. NYDEN.